US010747291B2

(12) United States Patent
Humphrey et al.

(10) Patent No.: US 10,747,291 B2
(45) Date of Patent: Aug. 18, 2020

(54) OVERCURRENT EVENT POWER THROTTLING

(71) Applicant: Hewlett Packard Enterprise Development LP, Houston, TX (US)

(72) Inventors: Daniel Humphrey, Houston, TX (US); Stewart Gavin Goodson, II, Houston, TX (US); Mark Rivera, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 98 days.

(21) Appl. No.: 15/964,532

(22) Filed: Apr. 27, 2018

(65) Prior Publication Data

US 2019/0332155 A1    Oct. 31, 2019

(51) Int. Cl.
*G06F 1/32* (2019.01)
*G06F 1/3206* (2019.01)
*G06F 1/28* (2006.01)
*G06F 1/3293* (2019.01)
*G06F 1/30* (2006.01)

(52) U.S. Cl.
CPC .............. *G06F 1/3206* (2013.01); *G06F 1/28* (2013.01); *G06F 1/30* (2013.01); *G06F 1/3293* (2013.01)

(58) Field of Classification Search
CPC .................................................. G06F 1/3206
See application file for complete search history.

(56) References Cited

U.S. PATENT DOCUMENTS

| 4,937,757 A * | 6/1990 | Dougherty | H02H 3/006 |
| | | | 361/97 |
| 6,356,423 B1 * | 3/2002 | Hastings | H02H 3/087 |
| | | | 361/93.2 |
| 7,162,656 B2 | 1/2007 | Vogman | |
| 2012/0144215 A1 | 6/2012 | Naffziger et al. | |
| 2017/0070045 A1 | 3/2017 | Hong et al. | |
| 2017/0126140 A1 | 5/2017 | Yu et al. | |

OTHER PUBLICATIONS

Lee; "What is a power supply's over current protect (OCP) and how does it work?"; Nov. 10, 2016; 3 pages.
White Paper; "Advances in Power and Environmental Monitoring for Increasing Efficiency in the Data Center"; Oct. 2014; 22 pages.

* cited by examiner

*Primary Examiner* — Albert Wang
(74) *Attorney, Agent, or Firm* — Brooks, Cameron & Huebsch, PLLC

(57) ABSTRACT

An example system includes a server including a power supply and a microcontroller. The power supply may store parameters for a plurality of different ranges of overcurrent and a plurality of corresponding different time periods. The power supply may also receive information from the electrical component corresponding to the speed at which the electrical component can reduce the amount of power the electrical component is consuming. The controller may receive information from the power supply to determine the amount of current that will cause an overcurrent event in the electrical component. The controller may signal the electrical component to reduce the amount of power the electrical component is drawing from the power supply in response to the detected amount of current corresponding to the overcurrent event.

10 Claims, 4 Drawing Sheets

OVERCURRENT EVENT POWER THROTTLING

BACKGROUND

An overcurrent is any current load in excess of the safety rating of equipment or the ampacity of a conductor. If an overcurrent is allowed to persist it can cause damage to the circuit components that are receiving the overcurrent. Overcurrent protection devices throttle power from the power supply upon the detection of an overcurrent.

DETAILED DESCRIPTION

Figure 1A:
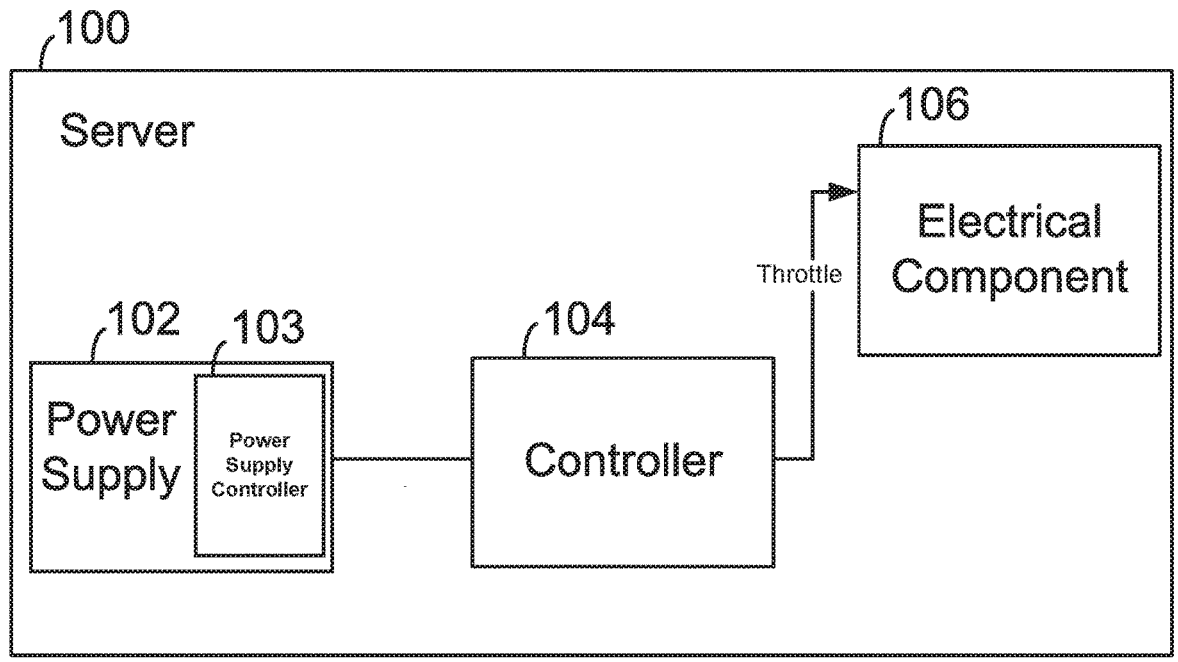
FIG. 1A illustrates an example of a system for overcurrent event power throttling.

An overcurrent can result from an overload, a short circuit, or a ground fault. An overload may be a condition in which equipment or conductors carry current exceeding their rated ampacity. A short circuit may be the unintentional electrical connection between any two normally current-carrying conductors of a circuit. A ground fault may be an unintentional, electrically conducting connection between an undergrounded conductor of a circuit and the equipment grounding conductor, metallic enclosures, metallic raceways, metallic equipment, or earth.

Overcurrent protection devices may protect circuits and/or equipment. An overcurrent protection device may protect a circuit by opening when the current reaches a certain value. When the current rises to a level that could cause an excessive temperature increase in the conductor, the overcurrent protection device may throttle the power from the power supply. Overcurrent protection devices may protect equipment by opening when they detect a short circuit or ground fault. Overcurrent protection devices include but are not limited to fuses and circuit breakers.

As used herein, the term "fuse" can, for example, refer to an electrical safety device that operates to provide overcurrent protection of an electrical circuit. Fuses may feature a metal wire or strip with a low resistance. The wire or strip may melt whenever a current higher than the rating of the wire or strip flows through it. This may interrupt the current and reduce power to the system. Once a fuse has been used once it cannot be used again.

As used herein, the term "circuit breaker" can, for example, refer to an automatically operated electrical switch designed to protect an electrical circuit from damage caused by an overcurrent. When a circuit breaker detects a fault condition, it may operate an opening mechanism. This may interrupt the circuit and is commonly done using mechanically stored energy contained within the breaker, such as a spring or compressed air to separate the contacts. Operating the opening mechanism may throttle power to the circuit.

The figures herein follow a numbering convention in which the first digit corresponds to the drawing figure number and the remaining digits identify an element or component in the drawing. Similar elements or components between different figures may be identified by the use of similar digits. For example, 104 may reference element "04" in FIG. 1A, and a similar element may be referenced as 204 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure and should not be taken in a limiting sense.

FIG. 1A illustrates an example of a system for overcurrent event power throttling consistent with the disclosure. The system can include a server 100. As used herein, a server may refer to a computer program or device that provides functionality for other devices or programs. In some examples, the server 100 can be a blade server or a rack-mount server.

As shown in FIG. 1A, the server 100 may include a power supply 102, a controller 104, and an electrical component 106. As used herein, the term "power supply" can, for example, refer to an electrical device that supplies electric power to an electrical load. In some examples, the power supply 102 may be a direct current (DC) power supply that supplies a constant DC voltage to the electrical components of the server 100. An example of a power supply is a Hewlett Packard Enterprise (HPE) 2900-3400 W Hot Plug Platinum power supply however, examples are not limited to specific protocols, brands, and/or model numbers of power supplies, and the power supply 102 may be any suitable power supply that provides communication between the power supply 102 itself and the controller 104.

The power supply 102 may contain a power supply controller 103 with processing and memory. The power supply controller 103 may store the ranges of overcurrent and the time period associated with each range. The power supply controller 103 may gather information from the electrical component 106 about the amount of current the electrical component 106 can safely receive. The power supply controller 103 may then apply that information to the ranges of overcurrent and time periods associated with those ranges already stored in the power supply controller 103. The power supply controller 103 may then transmit the ranges of overcurrent, the time periods associated with those ranges, and how the ranges of overcurrent and associated time periods apply to the electrical component 106 to the controller 104. The power supply controller 103 may measure the output current of the power supply 102 once every switching cycle and average that data before acting on any overcurrent.

As used herein, the term "time period" can, for example, refer to an amount of time an overcurrent can persist before it causes damage to an electrical component. The magnitude of an overcurrent may determine how long an overcurrent can persist without damaging an electrical component. If the overcurrent persists beyond the amount of time an electrical component can safely accept that magnitude of current, the overcurrent may cause damage to the electrical component.

As used herein, a "controller" (e.g., the controller 104) can, for example, refer to hardware including one or more processing resources to control operation of one or more electronic devices or portions thereof. In some examples, a controller may include one or more memory resources such as ferroelectric RAM, NOR flash, programmable read-only memory (e.g., FPROM, EEPROM, OTP NVM, etc.) and/or RAM. The controller 104 may be embedded, or removable. In some examples, the controller 104 may be provided as a single integrated circuit or may be provided on a system on a chip (SoC). In some examples, the controller 104 may execute, using the one or more processing resources, instructions stored on the memory resources, or may execute instructions received by the controller externally.

As used herein, an "electrical component" (e.g. the electrical component 106) can, for example, refer to an electrical circuit (e.g., circuitry), hardware device (e.g., one or more processing resources and/or one or more memory resources), logic device, application-specific integrated circuit, field-programmable gate array, or combinations thereof, to perform one or more tasks or functions. For example, an electrical component can be a non-volatile dual in-line memory module (NV-DIMM), a graphics processing unit (GPU), a sound card, and a variety of other electrical circuits and devices.

A NV-DIMM can be a type of random access memory from computers. Non-volatile memory can be memory that retains its contents even when electrical power is removed, for example from an unexpected power loss, system crash, or normal shutdown. Dual in-line may identify the memory as using the DIMM package. NV-DIMMs may improve application performance, data security, and system crash recovery time.

A GPU can be a specialized electronic circuit designed to rapidly manipulate and alter memory to accelerate the creation of images in a frame buffer intended for output to a display device. GPUs may be used in embedded systems, mobile phones, personal computers, workstations, and game consoles. In personal computers, the GPU may be present on a video card or it can be embedded on a motherboard.

A sound card can be an internal expansion card that provides input and output of audio signals to and from a computer under the control of computer programs. A sound card can also be an external audio interface used for professional audio applications. Sound cards may be used to provide the audio component for multimedia applications such as music composition, editing video or audio, presentation, education and entertainment, and video projection.

Figure 1B:
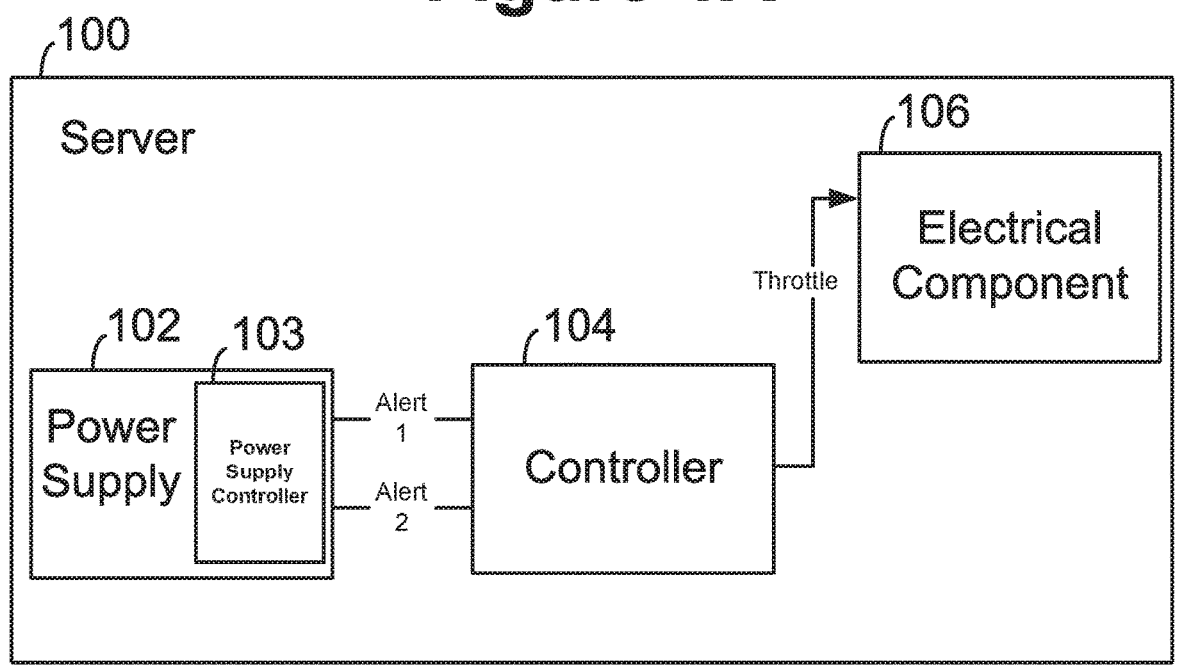
FIG. 1B illustrates another example of a system for overcurrent event power throttling.

FIG. 1B illustrates another example of a system for overcurrent event power throttling consistent with the disclosure. The server 100 may include a power supply 102, a power supply controller 103, a controller 104, and an electrical component 106. As shown in FIG. 1B, in some examples, the power supply 102 may provide alerts to the controller 104. As used herein, the term "alert" can, for example, refer to a signal to notify an electrical component that a specific action has occurred. In some examples, the alert may be a digital signal that notifies the controller 104 of an overcurrent. The alert may also be an analog signal. These examples are not intended to limit the scope of the invention and other types of communication may be used to notify the controller 104 of an overcurrent. To detect an overcurrent, the power supply 102 may first determine how much current an electrical component 106 can safely receive. In some examples, the power supply 102 may receive information from an electrical component to determine how much current the electrical component can safely receive. The power supply 102 may then classify any current drawn by the electrical component, that exceeds the level of current the power supply 102 determined to be safe, an overcurrent. If an overcurrent occurs, the electrical component 106 may communicate to the controller 104 whether it will be able to lower the current it is receiving before the overcurrent causes damage to the electrical component 106.

Different alerts may notify the controller 104 of different ranges of overcurrent. As used herein, the term "range" of overcurrent can, for example, refer to classifications assigned to an overcurrent that exceed the level of current deemed safe by specified amounts (e.g., an amount of current that exceeds a threshold current value). The power supply 102 may know the appropriate range of an overcurrent and transmitting that information to the controller 104.

In some examples, each time period may be associated with a range of overcurrent and an alert. The amount of time an overcurrent can persist without damaging an electrical component may decrease at higher ranges of overcurrent, as shown in Table 1. One alert may notify the controller 104 of an overcurrent of a certain range. The controller 104 may then associate that range with the corresponding time period. Once the range and time period of the overcurrent are properly recognized, the controller 104 may allow the overcurrent to persist for the time period associated with that range. If the overcurrent does not cease within the time period, the controller 104 may throttle the power to the server 100. In some examples, the controller may throttle power to the server 100 if the electrical component 106 consumes more power than the power supply 102 can provide. As used herein, the term "throttle power" can, for example, refer to a controller (e.g., controller 104 illustrated in FIG. 1A, herein) signaling an electrical component (e.g., electrical component 106 illustrated in FIG. 1A, herein) to reduce the amount of power the electrical component is consuming.

A separate alert may notify the controller 104 of an overcurrent of a different range. The controller 104 may then associate this second range with the corresponding time period, as shown in Table 1. Once the range and time period of the overcurrent are properly recognized, the controller 104 may allow the overcurrent to persist for the time period associated with that range. If the overcurrent does not cease within the time period, the controller 104 may throttle the power to the server 100. In some examples, once the controller 104 signals for an electrical component 106 to lower its power consumption, the electrical component may be able to lower its power consumption instantaneously. The electrical component may also lower its power consumption over a period of time.

Both alerts simultaneously may notify the controller of an overcurrent of different range than either of the other alerts individually, as shown in Table 1. The controller 104 may then associate this third range of overcurrent with the corresponding time period. Once the range and time period of the overcurrent are properly recognized, the controller 104 may allow the overcurrent to persist for the time period associated with that range. If the overcurrent does not cease within the time period, the controller 104 may throttle the power to the server 100.

TABLE 1

|  | Alert 1 | Alert 2 | Time Period |
| --- | --- | --- | --- |
| Normal Operation | 0 | 0 | N/A |
| OC Level 1 | 1 | 0 | 100 ms |
| OC Level 2 | 0 | 1 | 5 ms |
| OC Level 3 | 1 | 1 | 1 ms |

As shown in the example in Table 1, the power supply 102 may generate a first alert (e.g., Alert 1 illustrated in FIG. 1B) and/or a second alert (e.g., Alert 2 illustrated in FIG. 1B). If the server 100 is operating under normal operating conditions (e.g., an overcurrent has not been detected), the power supply 102 may not generate any alerts. For example, the power supply 102 may not generate Alert 1 or Alert 2. If an overcurrent of a first range is detected (e.g., overcurrent level 1 is detected), the power supply 102 may generate Alert 1, which may correspond to a first time period during which the controller 104 may allow the overcurrent to persist.

In the example shown in Table 1, the first time period may be 100 milliseconds (ms), although examples are not limited to a particular duration of time, and the controller 104 may allow the overcurrent to persist for greater than 100 ms or less than 100 ms in some examples. The parameters of the first range of overcurrent correspond to a range of overcurrent at which the safety rating of the server 100 is maintained.

If an overcurrent of a second range is detected (e.g., overcurrent level 2 is detected), the power supply 102 may generate Alert 2, which may correspond to a second time period during which the controller 104 may allow the overcurrent to persist. In the example shown in Table 1, the second time period may be 5 ms, although examples are not limited to a particular duration of time, and the controller 104 may allow the overcurrent to persist for greater than 5 ms or less than 5 ms in some examples. The parameters of the second range of overcurrent correspond to a range of overcurrent at which the server 100 is protected from server transients. As used herein, the term "server transient," can, for example, refer to a momentary burst of energy in a server caused be a sudden change of state. The source of the transient energy may be an internal event or a nearby event. Examples of server transients can include momentary variations in current, voltage, and/or frequency, etc.

If an overcurrent of a third range is detected (e.g., overcurrent level 3 is detected), the power supply 102 may generate Alert 1 and Alert 2, which may correspond to a third time period during which the controller 104 may allow the overcurrent to persist. In the example shown in Table 1, the third time period may be 1 ms, although examples are not limited to a particular duration of time, and the controller 104 may allow the overcurrent to persist for greater than 1 ms or less than 1 ms in some examples. The parameters of the third range of overcurrent correspond to a range of overcurrent at which the power supply 102 and the server 100 are protected from a short circuit.

The range of an overcurrent may change as the overcurrent persists. If the magnitude of an overcurrent increases or decreases to the extent that the overcurrent moves into a different range of overcurrent, the time period associated with that overcurrent may change accordingly. The amount of time an overcurrent persisted at its previous range will be subtracted from the amount of time remaining in the time period associated with the new range of the overcurrent. For example, if the overcurrent decreases to the point where it moves to a lower range of overcurrent, the time spent at the higher range of overcurrent will be subtracted from the period of time the overcurrent, at its now lower level, can persist without damaging the electrical component.

Figure 2:
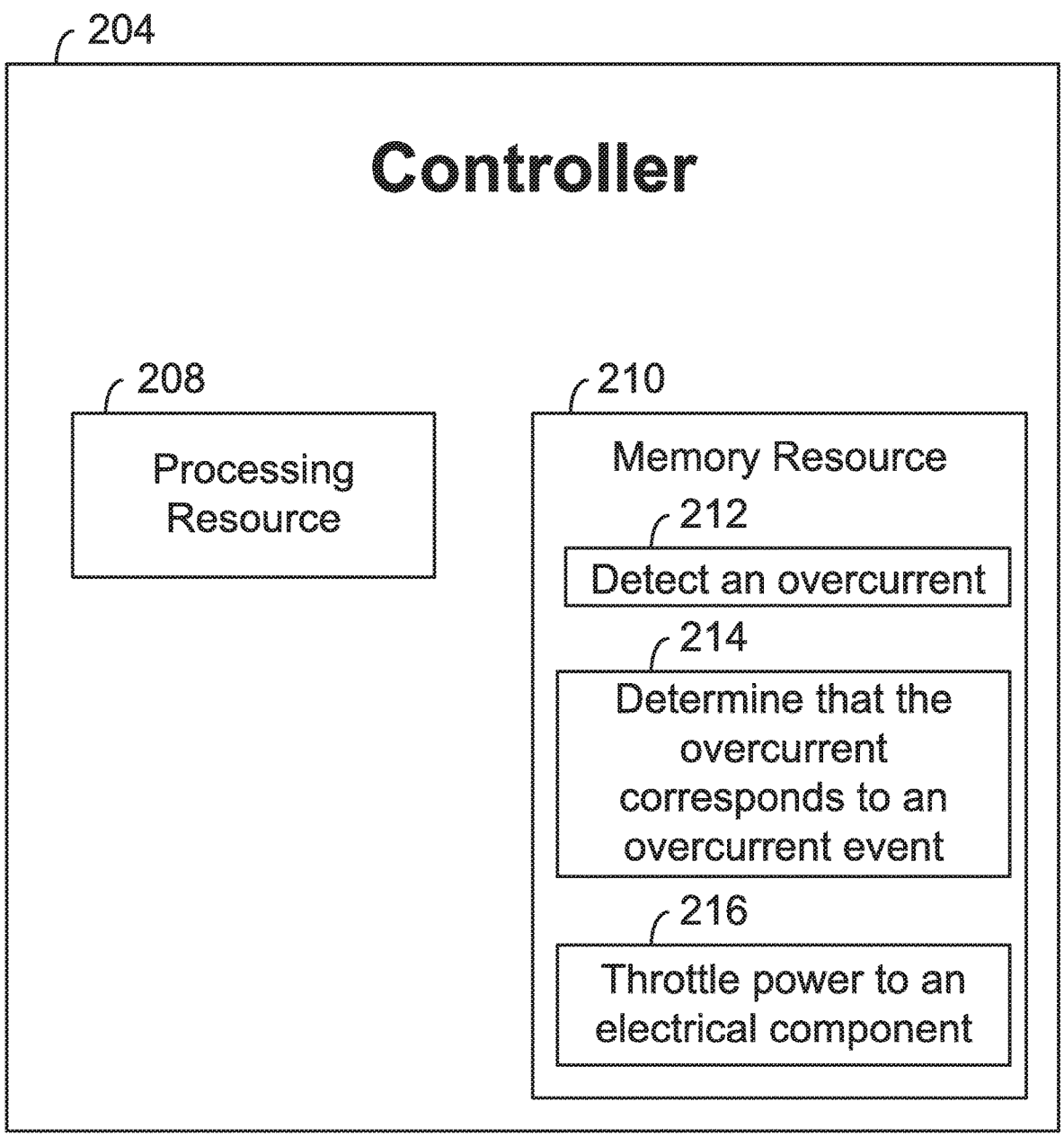
FIG. 2 illustrates an example of an apparatus for overcurrent event power throttling.

FIG. 2 illustrates an example of an apparatus for overcurrent event power throttling consistent with the current disclosure. Controller 204 includes a processing resource 208 and a memory resource 210. The processing resource 208 may receive alerts from the power supply (e.g., power supply 102 as illustrated in FIG. 1A) notifying the controller 204 of an overcurrent. The processing resource 208 may determine the range of overcurrent based on the alert which notified the processing resource 208 of the overcurrent.

As used herein, the term "processing resource" can, for example, refer to an electronic circuit which performs operations on some external data source, usually memory or some other data stream. The processing resource 208 may execute instructions stored on the memory resource 210. The memory resource 210 may contain instructions which instruct the processing resource 208 to throttle power from the power supply if an overcurrent persists for longer than a certain period of time.

As used herein, the term "memory resource" can, for example, refer to an integrated circuit that stores information for immediate use in a computer. In some examples, the memory resource 210 may include ferroelectric RAM, NOR flash, programmable read-only memory (e.g., FPROM, EEPROM, OTP NVM, etc.) and/or RAM, among other volatile and/or non-volatile memory resources. The memory resource 210 may store instructions for the processing resource 208 to execute.

In some examples, the memory resource 210 may store instructions executable by the processing resource 208 to cause the processing resource 208 to detect an overcurrent, as shown at block 214. The memory resource 210 may further store instructions executable by the processing resource 208 to cause the processing resource 208 to determine that the overcurrent corresponds to an overcurrent event, as shown at block 214. In some examples, the memory resource 210 may further store instructions executable by the processing resource 208 to cause the processing resource 208 to throttle power to an electrical component, as shown at block 216. For example, the memory resource 210 may further store instructions executable by the processing resource 208 to cause the processing resource 208 to throttle power to an electrical component responsive to a determination that the overcurrent persists for longer than a predetermined period of time, wherein the memory resource 210 is to store data corresponding to different ranges of overcurrent and the periods of time the overcurrents are allowed to persist before the controller 204 throttles power to the electrical component.

The memory resource 210 may store instructions that instruct the processing resource 208 on how to detect overcurrents. The processing resource 208 may execute instructions stored on the memory resource 210 that state that a specific alert signals that an overcurrent of a certain range has been detected. For example, the memory resource 210 may store instructions for the processing resource 208 to accept a first alert (e.g., Alert 1 illustrated in FIG. 1B and described in connection with Table 1, herein). Once that overcurrent has been detected, the processing resource 208 may execute instructions stored on the memory resource 210 directing the processing resource 208 to allow the overcurrent to persist for a time period associated with that range of overcurrent. If the overcurrent persists for longer than the time period associated with the overcurrent, the processing resource 208 may execute instructions stored on the memory resource 210 directing the processing resource 208 to throttle power to the server (e.g., server 100 illustrated in FIG. 1A). If the overcurrent ends before it reaches the time period associated with its range of overcurrent, the processing resource 208 may execute instructions stored on the memory resource 210 directing the processing resource 208 to continue to allow the power to continue moving through the server.

The memory resource 210 may store instructions for the processing resource 208 to accept a second alert (e.g., Alert 2 illustrated in FIG. 1B and described in connection with Table 1, herein). The second alert may notify the processing resource 208 that an overcurrent event in the second range has occurred. The memory resource 210 may store a second time period associated with the second range of overcurrent. The processing resource 208 may execute instructions from the memory resource 210 directing the processing resource 208 to allow an overcurrent of the second range to persist for the second time period. The processing resource 208 may also execute instructions from the memory resource 210 directing the processing resource 208 to throttle power to the server if the overcurrent lasts longer than the second time period.

The memory resource 210 may store instructions for the processing resource 208 to receive a third alert. The third alert may be a combination of both the first and second alerts activating in response to detecting an overcurrent, as shown in Table 1, herein. The third alert may notify the processing resource 208 of an overcurrent of a third range. The memory resource 210 may store a third time period associated with the third range of overcurrent. The processing resource 208 may execute instructions from the memory resource 210 directing the processing resource 208 to allow the overcurrent to persist for the time period associated with that range of overcurrent. The processing resource 208 may also execute instructions from the memory resource 210 directing the processing resource 208 to throttle power to the server if an overcurrent of the third range persists for longer than the third time period.

Figure 3A:
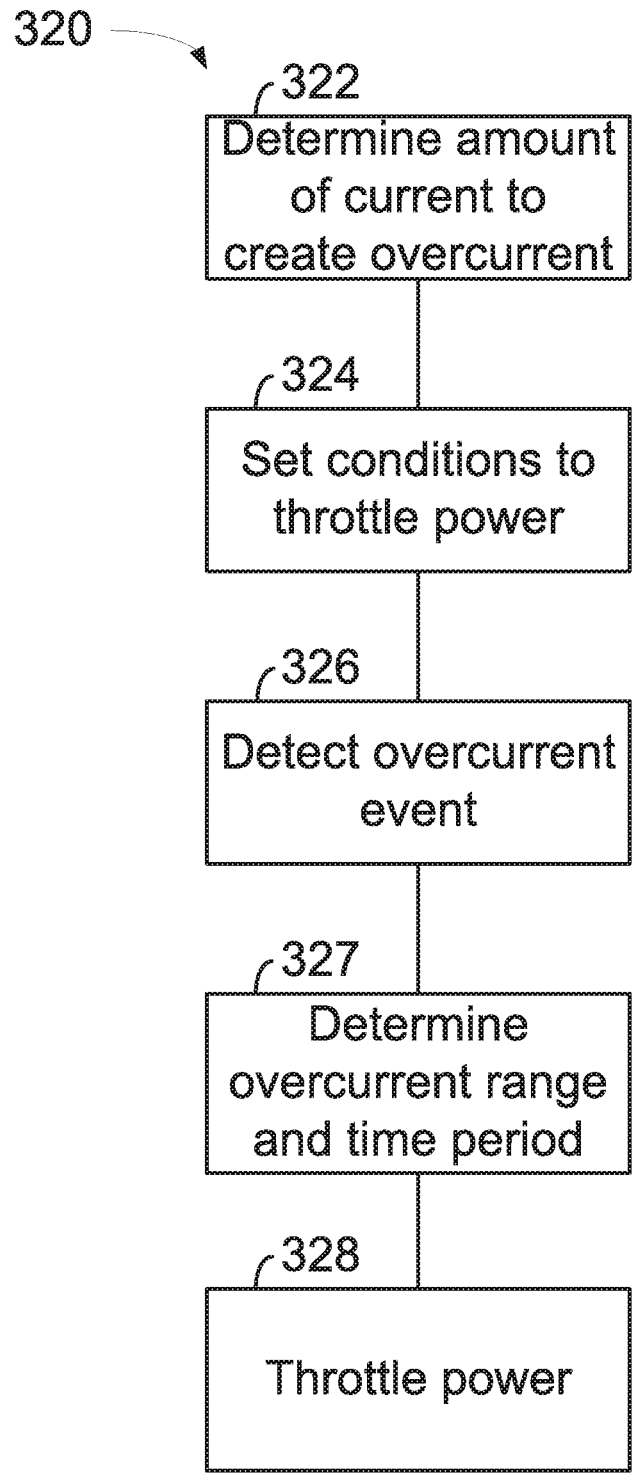
FIG. 3A illustrates an example flow diagram of a method for overcurrent event power throttling.

FIG. 3A illustrates an example of a flow diagram of a method for overcurrent event power throttling consistent with the disclosure. At block 322, the method may include determining an amount of current to create an overcurrent. For example, the method may include determining, using a power supply, an amount of current needed to create an overcurrent. In some examples the method may include determining the parameters of an overcurrent. The power supply (e.g., power supply 102 illustrated in FIG. 1A, herein) may receive information from the different electrical components in a server (e.g., server 100 illustrated in FIG. 1A, herein). The power supply may determine how much current an electrical component can safely receive and determine the parameters of an overcurrent based on that information.

At block 324, the method may include setting conditions to throttle power. For example, the method may include setting conditions wherein a controller will throttle power to an electrical component responsive to a determination that an overcurrent event has occurred. The conditions for throttling power may be stored in a memory resource (e.g., memory resource 210 illustrated in FIG. 2). In some examples, the memory resource may be part of, or may be coupled to, the power supply controller (e.g., power supply controller 103 illustrated in FIG. 1A, herein). The memory resource may store the power supply's reading on how much current an electrical component can safely receive and/or the amount of current that causes an overcurrent. The memory resource may also store different time periods associated with different ranges of overcurrent. The memory resource may store instructions stating that the controller (e.g., controller 204 illustrated in FIG. 2) will throttle power from the power supply if the overcurrent persists longer than the time period associated with its range.

At block 326, the method may include detecting an overcurrent. The power supply and/or the controller may detect an overcurrent. After this the power supply may notify the controller of the overcurrent. The controller may be notified using alerts (e.g., Alert 1 and/or Alert 2 illustrated in FIG. 1B, herein) from the power supply. An alert may correspond to an overcurrent of a specified range. A separate alert may correspond to an overcurrent of a different range. In some examples, the first and second alert activating during the same overcurrent may correspond to an overcurrent of a third range.

At block 327, the method may include determining an overcurrent range and time period. For example, the method may include determining, using the controller, which of at least three different ranges of overcurrent and at least three different periods of time the overcurrent event corresponds to. In some examples, a memory resource may store parameters for three different ranges of overcurrent. The memory resource may also store three different periods of time associated with three different ranges of overcurrent. The controller may associate an overcurrent event with the corresponding range of overcurrent and associated time period.

At block 328, the method may include throttling power to the electrical component responsive to a determination that the overcurrent event lasts longer than a period of time associated with a range of overcurrent. In some examples, throttling the power may include throttling power to the server if an overcurrent meets the conditions for throttling power from the power supply. The memory resource may store the conditions for throttling the power supply. The controller may read the instructions for throttling power and execute those instructions when a variety of conditions are met.

Figure 3B:
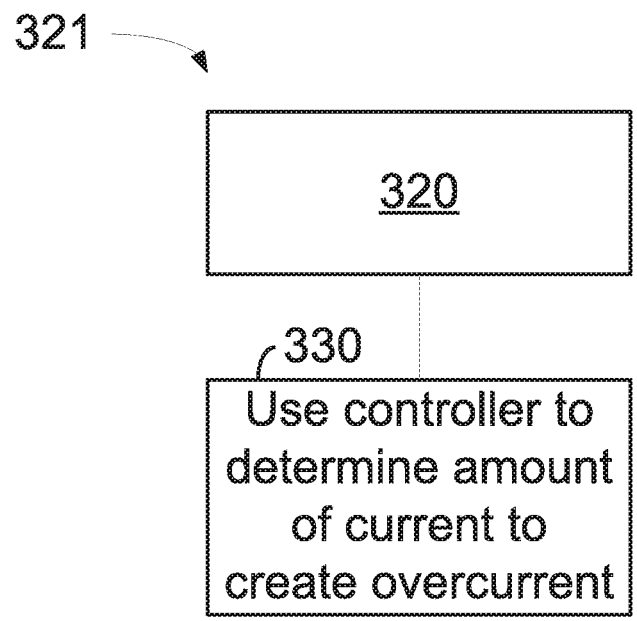
FIG. 3B illustrates another example flow diagram of a method for overcurrent event power throttling.

FIG. 3B illustrates an example flow diagram of a method for overcurrent event power throttling. The method 321 may include method 320 illustrated and described in connection with FIG. 3A, herein. At block 330, the method 321 may include determining the amount of current needed to create an overcurrent by receiving information from the power supply about the capacity of the electrical component to safely receive current.

In some examples, a power supply controller may gather information from an electrical component about the amount of current the electrical component can safely receive. The power supply controller may then apply that information to the ranges of overcurrent and time periods associated with those ranges already stored in the power supply controller. The power supply controller may then transmit the ranges of overcurrent, the time periods associated with those ranges, and how the ranges of overcurrent and associated time periods apply to the electrical component to the system controller. The power supply controller may measure the output current of the power supply once every switching cycle and average that data before acting on any overcurrent.

Figure 3C:
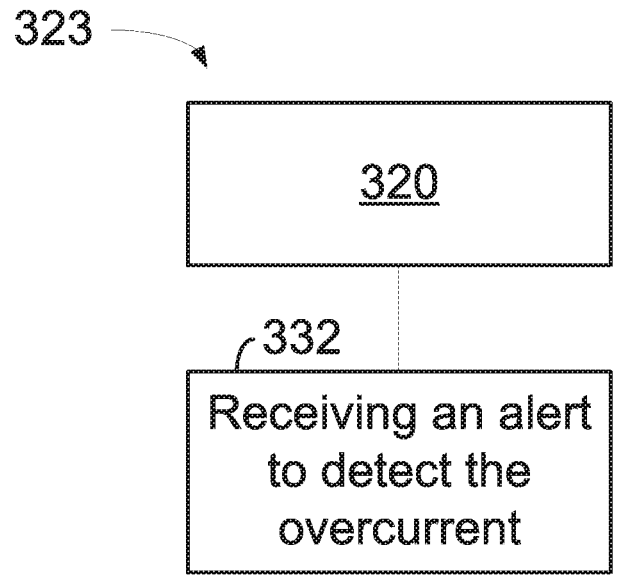
FIG. 3C illustrates yet another example flow diagram of a method for overcurrent event power throttling.

FIG. 3C illustrates an example flow diagram of a method for overcurrent event power throttling. The method 323 may include method 320 illustrated and described in connection with FIG. 3A, herein. At block 332, the method 323 may include receiving an alert to detect the overcurrent.

In one example, the controller may throttle power to the system based on the conditions for throttling power during a first range of overcurrent. The first alert may notify the controller that an overcurrent of a first range has occurred. The controller may then allow the overcurrent to persist for a time period associated with an overcurrent of that range. If the overcurrent persists longer than the time period associated with an overcurrent of that range, the controller may throttle power from the power supply to the server.

In another example, the controller may throttle power to the system based on the conditions for throttling power during a second range of overcurrent. The second alert may notify the controller that an overcurrent of a second range has occurred. The controller may then allow the overcurrent to persist for a time period associated with an overcurrent of that range. If the overcurrent persists longer than the time period associated with an overcurrent of that range, the controller may throttle power from the power supply to the server.

In another example, the controller may throttle power to the system based on the conditions for throttling power during a third range of overcurrent. Both the first and second alerts activating may notify the controller that an overcurrent of a third range has occurred. The controller may then allow the overcurrent to persist for a time period associated with an overcurrent of that range. If the overcurrent persists longer than the time period associated with an overcurrent of that range, the controller may throttle power from the power supply to the system.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things.

What is claimed:

1. A system comprising:
    a server including:
        a power supply including a microcontroller to:
            store parameters for a plurality of different ranges of overcurrent and a plurality of corresponding different time periods; and
            receive information from an electrical component corresponding to the speed at which the electrical component can reduce an amount of power the electrical component is consuming; and
        a controller to:
            receive information from the power supply to determine an amount of current that will cause an overcurrent event in the electrical component; and
            signal the electrical component to reduce the amount of power the electrical component is drawing from the power supply in response to the detected amount of current corresponding to the overcurrent event.

2. The system of claim 1, wherein the controller is to receive an alert to detect the overcurrent.

3. The system of claim 2, wherein the alert comprises:
    a first alert signal corresponding to a first range of overcurrent;
    a second alert signal corresponding to a second range of overcurrent; and
    a third alert signal corresponding to a third range of overcurrent, and wherein a first alert signal and a second alert signal in combination correspond to a third range of overcurrent.

4. The system of claim 1; wherein the controller is to:
    allow a first range of overcurrent to continue for a first period of time;
    allow a second range of overcurrent to continue for a second period of time; and
    allow a third range of overcurrent to continue for a third period of time.

5. The system of claim 1, wherein the controller throttles power to the electrical component responsive to a determination that the overcurrent corresponding to a first range of overcurrent lasts longer than a first period of time, a determination that the overcurrent corresponding to a second range of overcurrent lasts longer than a second period of time, and a determination that the overcurrent corresponding to a third range of overcurrent lasts longer than a third period of time.

6. The system of claim 1, wherein the range of overcurrent is altered during the overcurrent event, and wherein a period of time the overcurrent event is allowed to last is altered respective to a change in a range of overcurrent.

7. The system of claim 1, wherein, as the overcurrent range changes and at least one of the corresponding plurality of time periods changes, an amount of time spent at a first range of overcurrent is carried over to a second range of overcurrent.

8. The system of claim 1, wherein parameters of a first range of overcurrent correspond to a range of overcurrent at which at least one of the server and the power supply safely operates.

9. The system of claim 1, wherein parameters of a second range of overcurrent correspond to a range of overcurrent at which the server is protected from a server transient, wherein the server transient includes at least one of a variation in current, a variation in voltage, and a variation in frequency.

10. The system of claim 1, wherein parameters of the third range of overcurrent correspond to a range of overcurrent at which at least one of the power supply and the server is protected from a short circuit.

* * * * *